Patented June 21, 1949

2,473,498

UNITED STATES PATENT OFFICE 2,473,498

SYNTHETIC RESINS DERIVED FROM ACRYLONITRILE ADDUCTS

James R. Dudley, Cos Cob, Conn., assignor to American Cyanamid Company, New York, N. Y., a corporation of Maine No Drawing. Application March 1, 1946, Serial No. 651,375

18 Claims. (Cl. 260—2)

This invention relates to synthetic resinous materials and their preparation and more particularly, to those materials suitable for the removal of anions from liquids and to processes of purifying liquids by means of the resins.

It is an object of the present invention to prepare a resin from a polyalkylene polyamine, acrylonitrile, and an ammonocarbonic acid.

It is another object of the present invention to prepare a resin from a polyalkylene polyamine and an addition product of acrylonitrile with an ammonocarbonic acid.

A further object of the present invention is to provide a resinous material which is insoluble in water and which is suitable for the removal of anions from water and other liquids.

Still another object of the present invention is to provide a process for producing new synthetic resinous materials, and more particularly to provide a process for producing resinous materials suitable for the removal of anions from liquids.

These and other objects are attained by bringing about reaction between a polyalkylene polyamine, acrylonitrile, and an ammonocarbonic acid such as cyanamide, dicyandiamide, a guanidine, a biguanide, etc.

It is still another object of the present invention to provide an improved process for removing anions from water and other liquids.

This and other objects of the present invention are attained by contacting a liquid containing anions with a water-insoluble granular resin of the type described in the preceding paragraphs.

The invention will be described in greater detail in conjunction with the following specific examples, in which the proportions are given in parts by weight unless otherwise indicated. It is not intended that the scope of the present invention be restricted to the details set forth in the examples.

Example 1

| | Parts |
|---|---|
| Dicyandiamide (0.42 mol) | 35.3 |
| Acrylonitrile (4.2 mols) | 222.6 |
| Tetraethylenepentamine (1 mol) | 189 |

A mixture of the dicyandiamide and acrylonitrile is refluxed for about 24 hours and the resulting syrup is cured by heating for 16 hours at 100° C. The final weight of the hard, dense resin obtained indicates a pick-up of 6.8 mols of the acrylonitrile per mol of dicyandiamide.

The acrylonitrile-dicyandiamide adduct is mixed with the tetraethylenepentamine, and the resulting paste is cured for 4 hours at 100° C. in a steam heated oven. During this low temperature cure considerable ammonia is evolved from the paste, and a resinous product is produced. This is cured further by heating for 17 hours at 160° C. During the resin formation 1.7 mols of ammonia is evolved per mol of tetraethylenepentamine and 3.6 mols of ammonia per mol of acrylonitrile-dicyandiamide product.

The resin is ground, screened to 20–40 mesh material, and evaluated. The resin has a capacity of 8.8 kilograins of calcium carbonate per cubic foot of resin and a density of 6.3 lbs./cu. ft.

Example 2

| | Parts |
|---|---|
| Dicyandiamide (0.5 mol) | 42 |
| Acrylonitrile (4.0 mols) | 212 |
| Tetraethylenepentamine (1 mol) | 189 |

The dicyandiamide is added to the tetraethylenepentamine. The slurry solution is heated, and the acrylonitrile is added thereto over a 5–15 minute period. During the addition mild refluxing occurs and considerable ammonia is evolved. After the addition the resulting syrup is heated by means of steam for 30 minutes, after which the syrup is cured by heating for about 17 hours at 150° C.

The brittle, porous, orange to red color resin has a capacity of 10.6 kilograins of calcium carbonate per cubic foot of resin and a density of 12.2 lbs./cu. ft.

Example 3

| | Parts |
|---|---|
| Dicyandiamide (0.5 mol) | 42 |
| Acrylonitrile (6.0 mols) | 318 |
| Tetraethylenepentamine (1 mol) | 189 |

The procedure of Example 2 is followed, and the resin obtained has a capacity of 8.1 kilograins of calcium carbonate per cubic foot of resin and a density of 14.3 lbs./cu. ft.

Example 4

| | Parts |
|---|---|
| Dicyandiamide (0.5 mol) | 42 |
| Acrylonitrile (3 mols) | 159 |
| Tetraethylenepentamine (1 mol) | 189 |

The procedure of Example 2 is followed, and the resin obtained has a capacity of 10.4 kilograins of calcium carbonate per cubic foot of resin and a density of 10.0 lbs./cu. ft.

Example 5

| | Parts |
|---|---|
| Cyanamide (1 mol) | 42 |
| Acrylonitrile (2 mols) | 106 |
| Tetraethylenepentamine (1 mol) | 189 |
| Water | 200 |

The cyanamide and acrylonitrile are combined to produce the white crystalline bis-(beta-cyanoethyl) cyanamide. The tetraethylenepentamine and water are mixed with the bis cyanamide compound, and the mixture is heated for one-half hour with steam. The viscous syrup obtained is then cured for 18 hours at 137° C. and the cured resin is granulated, screened and evaluated. It has a capacity of 12.9 kilograins of calcium carbonate per cubic foot of resin and a density of 10.0 lbs./cu. ft.

If the resin is cured for an additional 17 hours at 152° C., the capacity is slightly decreased to 11.9 kilograins calcium carbonate per cubic foot of resin while the density is increased to 12.5 lbs./cu. ft.

*Example 6*

| | Parts |
|---|---|
| Guanidine carbonate (0.25 mol; 0.5 mol as free guanidine) | 45 |
| Acrylonitrile (2.5 mols) | 135 |
| Tetraethylenepentamine (1 mol) | 189 |

The tetraethylenepentamine and guanidine carbonate are placed in a vessel equipped with means for agitation and with a condenser, and the mixture is heated with steam. Acrylonitrile is added to this slurry over a period of 20–30 minutes. After the addition is complete the syrup is heated about 30 minutes longer, during which period considerable ammonia is evolved. The resin syrup is then cured for 17 hours at 150° C. and the cured resin is ground, screened and evaluated. The resin has a capacity of 11.0 kilograins of calcium carbonate per cubic foot of resin and a density of 9.5 lbs./cu. ft.

*Example 7*

| | Parts |
|---|---|
| Tetraethylenepentamine (0.25 mol) | 47.2 |
| Acrylonitrile (1.0 mol) | 53 |
| Dicyandiamide (0.125 mol) | 10.5 |

The tetraethylenepentamine is placed in a vessel suitably equipped with means for agitation and a condenser, and it is heated with steam. The acrylonitrile is added over a half-hour period to the heated pentamine, during which addition period there is a copious evolution of ammonia. The clear syrup obtained is heated for an additional hour and then the dicyandiamide is added thereto. Heating is resumed for an hour during which time almost complete solution of the dicyandiamide occurs with no liberation of ammonia.

The syrup is cured by heating for 17 hours at about 150° C., and a glassy, translucent, reddish brown and hard resin is obtained.

Tetraethylenepentamine has been used in each of the preceding specific examples because it is commercially attractive, being readily available and not expensive. Other polyamines may be substituted for part or all of the tetraethylenepentamine. Furthermore, mixtures of two, three, five or any other number of polyamines may be employed.

Examples of suitable polyalkylene polyamines include diethylene triamine, triethylene tetramine, tetraethylene pentamine, pentaethylene hexamine, polymerized ethyleneimine and all of the higher homologues containing additional —CH₂CH₂NH— groups in the chain between the primary amino groups. Complex mixtures of polyethylene polyamines of high molecular weight obtained by the addition of large numbers of molecules of ammonia to ethylene dibromide or ethylene dichloride and the like may be used.

Heterocyclic and aromatic polyamines may also be used in the preparation of the products of the present invention, as may other type aliphatic polyamines such as 1,3-diaminopropane, di-3-aminopropyl amine, 1,3-diamino propanol-2, ethylene diamine, hexamethylene diamine, etc.

Any ammonocarbonic acid may be substituted for the cyanamide, dicyandiamide, and guanidine carbonate of the specific examples. Accordingly, the following compounds may be reacted with acrylonitrile and a polyalkylene polyamine according to the process of the present invention: cyanamide, dicyandiamide, guanidine, monosubstituted and asymmetric di-substituted guanidines such as mono-methyl guanidine, asymmetric di-isopropyl guanidine, asymmetric diphenyl guanidine, mono-benzyl guanidine, asymmetric di-phenyl-ethyl guanidine, asymmetric di-ethyl guanidine, mono-hexyl guanidine, etc., salts of guanidine and the mono-substituted and asymmetric di-substituted guanidines such as, for example, the carbonate, nitrate, sulphate, phosphate, etc., guanyl urea, biguanide, monosubstituted and asymmetric di-substituted biguanides such as asymmetric methyl ethyl biguanide, n-butyl biguanide, benzyl biguanide, asymmetric di-hexyl biguanide, phenyl biguanide, asymmetric di-phenyl biguanide, etc.

It will be apparent from the examples that the acrylonitrile may first be caused to react with the ammonocarbonic acid to form an addition product which is then admixed with the polyalkylene polyamine, or all three ingredients may be introduced simultaneously. It is also possible to first react the polyamine with the acrylonitrile and then add the ammonocarbonic acid to the reaction product obtained. The present invention is not limited to any particular method of combination of the reactants.

The particular molar proportions involved are not particularly critical. The cyanamide acrylonitrile addition product requires a 2:1 proportion of acrylonitrile to cyanamide although one of the moles of acrylonitrile is only loosely held by the cyanamide under most conditions. In the case of dicyandiamides, guanidines, biguanides, etc., the greater number of amino groups necessitates the use of a larger excess of acrylonitrile for complete reaction. The exact amount depends not only on the quantity of ammonocarbonic acid but also on the proportion of ammonocarbonic acid to the polyamine. Once the acrylonitrile addition product has been formed, or sufficient acrylonitrile provided for the formation thereof, I prefer to combine this addition product with the polyamine in a molar proportion of about 1:1 if it is a cyanamide-acrylonitrile addition product and in a molar proportion of about 2:1 if the addition product of acrylonitrile and either dicyandiamide or a guanidine is involved.

Rather extreme curing conditions are required by the resins of the present invention. I prefer to subject the resin syrups to about 150° C. for about 18 hours but the invention is not limited to this specific curing period, and other comparatively long periods of heating at relatively high temperatures may be used. It is obvious, of course, that the curing temperature cannot be increased to too great an extent or else the formation of piperazine rings from the polyamine will occur.

While I do not wish to be limited to any particular theory of mechanism of the reaction of the present invention, it is quite apparent that interaction between an imino group and an amino group takes place because of the copious evolution of ammonia during the resinification of the acrylonitrile adduct of an ammonocarbonic acid with a polyalkylene polyamine. The imino group or groups may result from cyclization of the acrylonitrile adducts to iso-melamines or imino pyrimidines, for example,

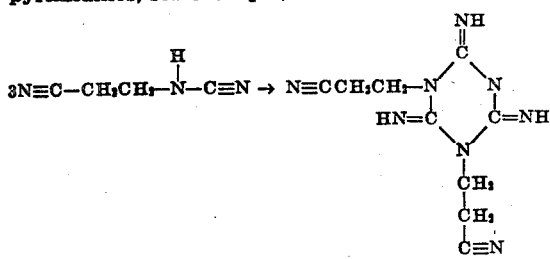

or they may be the result of the direct addition of an amine to a cyano group to form a substituted amidine, for example,

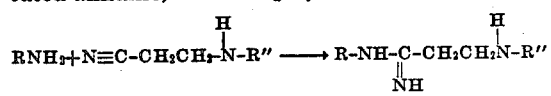

where R is the residue of the polyalkylene polyamine and R" is the residue of the acrylonitrile adduct. Ordinarily the latter reaction will not take place with alkyl cyano groups; however, the specific chemical structure of these acrylonitrile adducts might promote the reaction. Moreover, imino groups may be introduced through the raw materials, for example, guanidine and dicyandiamide.

Simultaneous splitting out of ammonia may cross-tie the molecules and form a 3-dimensional resin, for example,

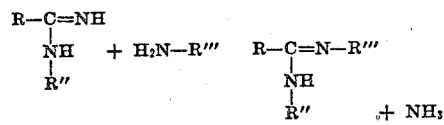

where R is the residue of the acrylonitrile adduct and R" and R''' are the residue of the polyalkylene polyamine. Regardless of the mechanism involved, cross-linking does occur in some manner to give the insoluble resins of the present invention.

The anion active resins may be activated or regenerated after exhaustion by means of dilute alkaline solutions such as, for example, 0.1 to 10% aqueous solutions of sodium hydroxide, sodium carbonate, etc.

The resinous materials produced in accordance with this invention are suitable for the removal of all kinds of acids and anions in general from liquid media, and for the exchange of all such anions in liquid media. They may be used to extract the strong mineral acids (preferably in relatively low concentrations) and organic acids such as acetic acid, oxalic acid, etc., from water. The anions of solids such as the chloride anion in ammonium chloride and the sulphate anion in ammonium sulphate may be removed by means of the resinous products described herein.

The anion active resins are useful for many purposes. Some of these uses are the removal of acid from water, the removal of acid from alcoholic solution, the purification of aqueous solutions containing sugar including sugar juices, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as media for growing plants or as a means for applying nutrients to the soil.

To be sufficiently insoluble for practical use in the water purification art, resins should have a sufficiently low solubility that they will not be dissolved rapidly by the solution to be treated. Thus, water should not dissolve more than one part of resin in 1000 parts of water when passed through a bed of resin after the first cycle comprising an activation, an exhaustion, and a reactivation of the resin.

It is preferable to grind and screen the resins to a particle size of from about 8–60 mesh. Use of larger particles causes channeling and smaller particles of resins have been found to pack, thus reducing the anion exchange efficiency of material.

I claim:

1. A resinous composition of matter which comprises the heat reaction product of, as sole resin-forming ingredients, a polyamine having a hydrogen atom attached to an aminonitrogen atom, acrylonitrile, and an ammonocarbonic acid selected from the group consisting of cyanamide, dicyandiamide, guanidine, mono- and asymmetric dihydrocarbon substituted guanidines, salts of guanidine and said substituted guanidines, biguanide, mono- and asymmetric di-hydrogen substituted biguanides, and guanyl urea.

2. A resinous composition of matter which comprises the heat reaction product of, as sole resin-forming ingredients, a polyamine having a hydrogen atom attached to an aminonitrogen atom, acrylonitrile, and cyanamide in respective molar proportions of 1:2:1.

3. A resinous composition of matter which comprises the heat reaction product of, as sole resin-forming ingredients, a polyamine having a hydrogen atom attached to an aminonitrogen atom, acrylonitrile, and dicyandiamide in respective molar proportions of 2:6:1 to 2:12:1.

4. A resinous composition of matter which comprises the heat reaction product of, as sole resin-forming ingredients, a polyamine having a hydrogen atom attached to an aminonitrogen atom, acrylonitrile, and a guanidine salt in respective molar proportions of 2:5:1.

5. A resinous material according to claim 6 in which the polyamine is tetraethylenepentamine.

6. A granular, water-insoluble resinous material obtained by a process including the steps of forming a heat reaction product of, as sole resin-forming ingredients, a polyalkylene polyamine having a hydrogen atom attached to an aminonitrogen atom, acrylonitrile and an ammonocarbonic acid selected from the group consisting of cyanamide, dicyandiamide, guanidine, mono- and asymmetric dihydrocarbon substituted guanidines, salts of guanidine and said substituted guanidines, biguanide, mono- and asymmetric di-hydrocarbon substituted biguanides, and guanyl urea, drying the reaction product by heating, and granulating the dried product.

7. A granular, water-insoluble resinous material obtained by a process including the steps of forming a heat reaction product of, as sole resin-forming ingredients, a polyalkylene polyamine having a hydrogen atom attached to an aminonitrogen atom with an addition product of acrylonitrile and an ammonocarbonic acid selected from the group consisting of cyanamide, dicyandiamide, guanidine, mono- and asymmetric di-hydrocarbon substituted guanidines, salts of guanidine and said substituted guanidines, biguanide, mono- and asymmetric di-hydrocarbon substituted biguanides, and guanyl urea, drying the reaction product by heating, and granulating the dried product.

8. A granular, water-insoluble resinous material obtained by a process including the steps of heating tetraethylenepentamine with an addition product of acrylonitrile and cyanamide, the ratio of addition product to pentamine being 1:1, drying the reaction product by heating, and granulating the dried product.

9. A granular, water-insoluble resinous material obtained by a process including the steps of heating tetraethylenepentamine with an addition product of acrylonitrile and dicyandiamide, the ratio of addition product to pentamine being 2:1, drying the reaction product by heating, and granulating the dried product.

10. A granular, water-insoluble resinous material obtained by a process including the steps of heating tetraethylenepentamine with an addition product of acrylonitrile and a guanidine salt, the ratio of addition product to pentamine being 2:1, drying the reaction product by heating, and granulating the dried product.

11. The process of preparing a granular, water-insoluble resinous material which comprises heating a mixture containing, as sole resin-forming ingredients, a polyalkylene polyamine having a hydrogen atom attached to an aminonitrogen atom, acrylonitrile and an ammonocarbonic acid selected from the group consisting of cyanamide, dicyandiamide, guanidine, mono- and asymmetric di-hydrocarbon substituted guanidines, salts of guanidine and said substituted guanidines, biguanide, mono- and asymmetric di-hydrocarbon substituted biguanides, and guanyl urea to remove ammonia, and granulating the de-ammoniated reaction product.

12. The process of preparing a granular, water-insoluble resinous material which comprises heating a polyalkylene polyamine having a hydrogen atom attached to an aminonitrogen atom with an addition product of acrylonitrile and an ammonocarbonic acid selected from the group consisting of cyanamide, dicyandiamide, guanidine, mono- and asymmetric di-hydrocarbon substituted guanidines, salts of guanidine and said substituted guanidines, biguanide, mono- and asymmetric di-hydrocarbon substituted biguanides, and guanyl urea to remove ammonia, and granulating the de-ammoniated reaction product.

13. A process for the removal of anions from liquid media which comprises bringing a liquid into contact with the granular, water-insoluble resinous material of claim 6, and separating said liquid from said resinous material.

14. A process for the removal of anions from aqueous liquids which comprises passing an aqueous liquid through and in contact with a bed of the granular, water-insoluble resinous material of claim 7.

15. A process for the removal of anions from aqueous liquids which comprises passing an aqueous liquid through and in contact with a bed of the granular, water-insoluble resinous material of claim 8.

16. A process for the removal of anions from aqueous liquids which comprises passing an aqueous liquid through and in contact with a bed of the granular, water-insoluble resinous material of claim 9.

17. A process for the removal of anions from aqueous liquids which comprises passing an aqueous liquid through and in contact with a bed of the granular, water-insoluble resinous material of claim 10.

18. A process which comprises heating together, as sole resin-forming ingredients, a polyamine having a hydrogen atom attached to an amino nitrogen atom, acrylonitrile, and an ammonocarbonic acid selected from the group consisting of cyanamide, dicyandiamide, guanidine, mono- and asymmetric di-hydrocarbon substituted guanidines, salts of guanidine and said substituted guanidines, biguanide, mono- and asymmetric di-hydrocarbon substituted biguanides, and guanyl urea to form a heat reaction product thereof.

JAMES R. DUDLEY.

REFERENCES CITED

The following references are of record in the file of this patent:

UNITED STATES PATENTS

| Number | Name | Date |
|---|---|---|
| 2,228,514 | Griessbach et al. | Jan. 14, 1941 |
| 2,259,169 | Little | Oct. 14, 1941 |
| 2,340,111 | D'Alelio | Jan. 25, 1944 |

Certificate of Correction

Patent No. 2,473,498

June 21, 1949

JAMES R. DUDLEY

It is hereby certified that error appears in the printed specification of the above numbered patent requiring correction as follows:

Column 6, line 33, for "di-hydrogen" read *di-hydrocarbon*;

and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*